F. F. KEELER.
AUXILIARY SPRING FOR VEHICLES.
APPLICATION FILED JULY 20, 1916.
1,218,409.
Patented Mar. 6, 1917.
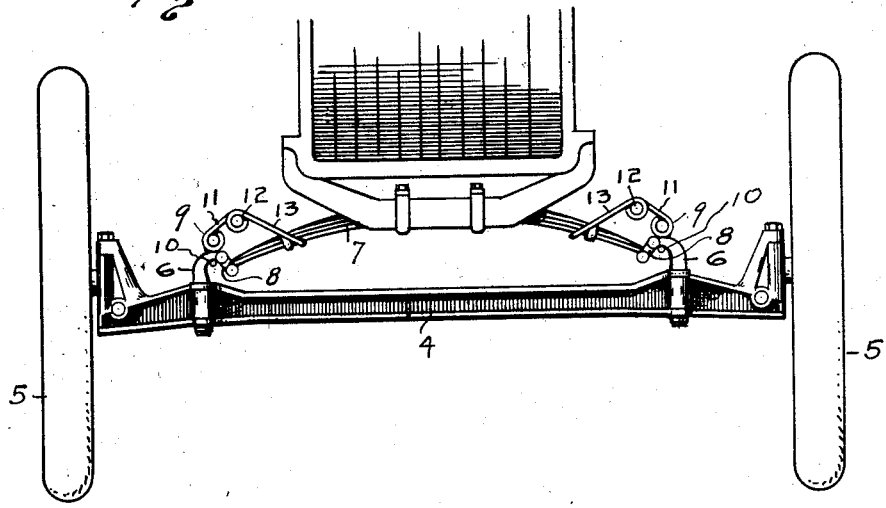
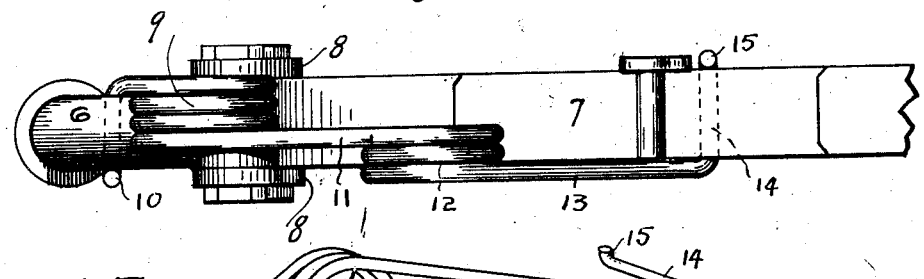
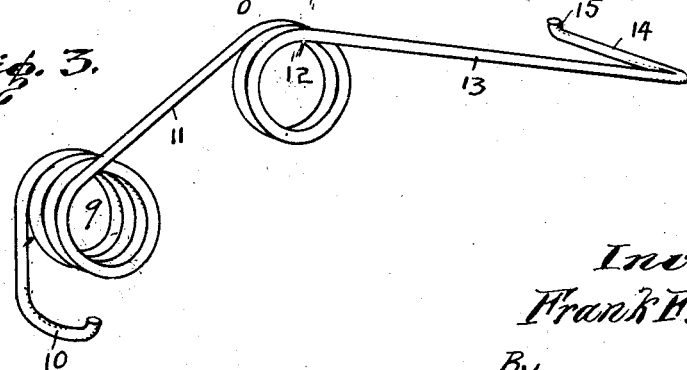
Inventor,
Frank F. Keeler,
By Minturn & Woernes
Attorneys

UNITED STATES PATENT OFFICE.

FRANK F. KEELER, OF WEST NEWTON, INDIANA, ASSIGNOR OF ONE-HALF TO THADDEUS R. BAKER, OF INDIANAPOLIS, INDIANA.

AUXILIARY SPRING FOR VEHICLES.

1,218,409.

Specification of Letters Patent.

Patented Mar. 6, 1917.

Application filed July 20, 1916. Serial No. 110,389.

*To all whom it may concern:*

Be it known that I, FRANK F. KEELER, a citizen of the United States, residing at West Newton, in the county of Marion and State of Indiana, have invented certain new and useful Improvements in Auxiliary Springs for Vehicles, of which the following is a specification.

This invention relates to spring supports for vehicle bodies, and particularly to motor vehicles, and the object is to provide a supplementary spring adapted to be readily and quickly applied as an attachment to vehicles already made, to supplement the springs installed by the maker of the vehicle, and by reducing the swing or side movement of the vehicle body, cause the vehicle to hold its course in the road with more certainty.

I accomplish the above and other objects which will hereinafter appear, by the mechanism illustrated in the accompanying drawing, in which—

Figure 1 is a front elevation of an automobile equipped with my invention. Fig. 2 is a top plan view of one of my supplementary springs applied and showing the adjacent parts to which it is applied, and Fig. 3 is a perspective view of one of the unattached springs.

Like characters of reference indicate like parts in the several views.

The axle 4 is supported in the usual manner by the wheels 5, and the axle supports the spring perches 6, 6. A leaf spring 7, attached to the body of the vehicle, is connected by shackles 8, 8, with the perches 6,—all in the usual manner.

My invention consists in the special construction and application of a supplementary spring, or rather a pair of them to the above structure, and as the same is repeated for the leaf spring and axle at the rear of the vehicle, that will be understood without illustration and description.

As the supplementary springs are made rights and lefts, for the two sides of the vehicle, but otherwise are the same, I have shown the assembly of the left front spring and will confine my description thereto with the understanding that same applies, with such modifications as will be obvious, to the remainder of the four springs used in equipping a vehicle.

My supplementary spring is formed out of a single piece of spring tempered wire which is bent into a coil 9. The wire at the inner end of the coil is tangentially extended far enough to reach below the neck of the perch 6 when the coil 9 is resting upon the head of the perch, and then the extended wire is bent laterally to form a hook 10 which goes under the neck of the perch, making a close fit so as to hold the coils 9 against the perch head. The other or outer end of the wire is extended tangentially of the coils 9 in an upwardly oblique direction to form the arm 11, and at the upper end of the latter the wire is bent to form the coil 12. The free end of the wire is extended tangentially of the last coil, in a downwardly oblique direction forming the arm 13, and then at right angles to form the arm 14, a little more than the width of the leaf spring 7 in length, and the end of arm 14 is bent up to form a short hook 15.

In the assembly of my supplementary spring, the hook 10 is slipped under the perch neck as shown, with the coil 9 resting upon and making a fulcrum against the head of the perch; then the remainder of the device is bent down by pressing upon the arm 14 until the latter is below the leaf spring when it is passed under the latter and is released with the spring 7 between the arm 13 and hook 15, as shown in Fig. 2.

In the operation of my device, the supplementary springs absorb the minor impacts by reason of their being more sensitive than the leaf springs and they continue to assist in resisting the heavier impacts. They reduce the swing of the body on the spring-shackles by the holding tendency of the supplementary spring on one side to keep the body from swinging away from it. Thus the supplementary spring on the left side of the vehicle holds the body from swinging toward the right, and the opposite supplementary spring holds the body from swinging toward the left, and between the two they hold the machine in the road with more certainty.

I claim—

1. The combination with the leaf spring of a vehicle and spring-supporting perch, of a supplementary spring having coils which bear against the top of the perch, said coil having a downward hook extension hooking under the perch, an arm extension above the leaf spring and holding means on the end of said arm to engage the under side of the leaf spring when the arm is forced down for that purpose.

2. The combination with a leaf spring of a vehicle and spring-supporting perch, of a supplementary spring having coils bearing against the top of the perch and a downward hook extension hooking under the perch, an arm extension upwardly from the coil and above the leaf spring until sprained down, holding means on the end of said arm to engage the under side of the leaf spring when the arm is forced down for that purpose, and a coil in the arm between said first coil and said end-holding means.

3. A supplementary spring for vehicles formed out of spring wire bent in a plurality of convolutions forming a coil tangentially from which coil one end of the wire is extended and formed with a terminal perch-hook, and the other end of which is tangentially extended from the coil in a substantially opposite direction forming an arm the end of which is formed with a leaf-spring holding member, said arm also having a coil formed therein between said first coil and the other end of the arm.

In witness whereof, I, have hereunto set my hand and seal at Indianapolis, Indiana, this 1st day of July, A. D. one thousand nine hundred and sixteen.

FRANK F. KEELER. [L. S.]